(12) United States Patent
Sun et al.

(10) Patent No.: US 6,321,157 B1
(45) Date of Patent: Nov. 20, 2001

(54) HYBRID MODELING AND CONTROL OF DISC ENGINES

(75) Inventors: Jing Sun, Bloomfield Township; Ilya Vladimir Kolmanovsky, Ypsilanti; Jeffrey Arthur Cook, Dearborn, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/564,334

(22) Filed: Aug. 14, 2000

Related U.S. Application Data
(60) Provisional application No. 60/131,301, filed on Apr. 27, 1999.

(51) Int. Cl.[7] .................................................. F02B 17/00
(52) U.S. Cl. ........................................... 701/103; 123/295
(58) Field of Search ..................... 701/103, 109; 123/295

(56) References Cited

U.S. PATENT DOCUMENTS

| | | | |
|---|---|---|---|
| 5,778,666 | * | 7/1998 | Cullen et al. ..................... 701/109 |
| 6,024,069 | * | 2/2000 | Yoshino ............................. 123/295 |
| 6,079,204 | * | 6/2000 | Sun et al. ............................ 60/274 |
| 6,119,449 | * | 9/2000 | Kohler ................................ 701/103 |
| 6,161,517 | * | 12/2000 | Sans ................................... 123/295 |
| 6,253,546 | * | 7/2001 | Sun et al. ........................... 701/109 |

* cited by examiner

*Primary Examiner*—Erick Solis
(74) *Attorney, Agent, or Firm*—Jerome R. Drouillard

(57) ABSTRACT

A method of modeling and controlling a direct injection stratified charge (DISC) engine coupled to a lean NOx trap that is periodically purged. The method comprises the steps of receiving as inputs a plurality of engine operating parameters and generating an indicated engine torque value, feedgas emission values, and an exhaust gas temperature value. Each of the output values is generated in accordance with a respective hybrid DISC engine model including an engine torque model, a feedgas emissions model, and an exhaust gas temperature model. The feedgas emissions model and exhaust gas temperature models further include submodels for generating output values as a function of either stratified or homogeneous engine operation.

16 Claims, 2 Drawing Sheets

HYBRID MODELING AND CONTROL OF DISC ENGINES

CROSS-REFERENCE TO RELATED APPLICATIONS

This application claims the benefit of U.S. Provisional Patent Application Ser. No. 60/131,301, filed Apr. 27, 1999, entitled, "Hybrid Modeling and Control of DISC Engine".

TECHNICAL FIELD

The present invention relates to engine modeling and control and more particularly to a method of modeling and controlling a direct injection stratified charge (DISC) engine.

BACKGROUND OF THE INVENTION

Gasoline DISC engine technology has the potential of improving fuel economy through the use of stratified combustion, which significantly extends the lean burn limit and reduces pumping losses in the engine. Compared with a conventional port fuel injection (PFI) gasoline engine, a DISC engine is much more complicated in its hardware and operating strategy. Like a PFI engine, a DISC engine consists of an intake manifold, combustion chambers, and an exhaust system. Its hardware design and configuration, however, are different from a PFI engine in several key aspects. The location of injectors is different. In a DISC engine, fuel is injected directly into the cylinder as opposed to the intake port. The fueling system also differs. A high pressure fueling system is an important aspect of the DISC technology and is operated at a pressure that is 10–15 times higher than that of a PFI fueling system. The combustion chamber configuration of DISC engines also include non-flat piston heads having deliberately designed cavities to ensure charge stratification. The after-treatment package of a DISC engine typically requires the combination of a three-way catalyst (TWC) and a lean $NO_x$ trap (LNT) to meet emission standards.

With the special piston design and the high pressure fueling system, a DISC engine can effect two distinct modes of operation by properly timing the fuel injection in relation to other engine events. By injecting early in the intake stroke, there is enough time for the mixing of air and fuel to form a homogeneous charge by the time the ignition event is initiated. On the other hand, by injecting late in the compression stroke, the special combustion chamber design and the piston motion will lead to the formation of a stratified charge mixture that is overall very lean, but rich around the spark plug. In a typical DISC engine, a properly positioned swirl control valve can also contribute to enforcing the stratification in one mode and assuring good mixing in another.

The torque and emission characteristics corresponding to these two modes are so distinct that different strategies are required to optimize the engine performance in these different modes. Furthermore, in addition to the standard engine control variables such as throttle, fueling rate, spark timing and exhaust gas recirculation (EGR), other inputs, such as injection timing, fuel rail pressure and swirl control valve setting are also available. In addition, like other lean burn technology engines, DISC engines require special exhaust gas treatment systems to meet emissions regulations. For example, the lean $NO_x$ trap (LNT), which represents a state-of-the-art technology for $NO_x$ reduction for lean burn engines, has a narrow temperature window and stringent air-fuel ratio control requirements. It also has to be periodically purged to regenerate its trapping capacity and maintain its efficiency. A DISC engine running in stratified mode typically requires the LNT to be purged by running slightly rich of stoichiometry for 2–3 seconds at about 50 second intervals. Managing the engine torque, as well as the LNT operating temperature during this purge cycle is important to maintaining driveability and system efficiency.

The increased system complexity, coupled with more stringent fuel economy and emissions requirements, has made the DISC engine a control-intensive technology which depends heavily on the control system to deliver its expected benefits. Given the multitude of control inputs and performance indices, such as fuel consumption, emissions and other driveability measures, the DISC engine control strategy development and system optimization rely heavily on model-based approaches and computer aided control design tools. Thus, there exists a need for a DISC engine model structure which encompasses both homogeneous and stratified mode of operation.

In addition, the engine control system must manage the LNT purge cycle described above without causing noticeable torque disturbance to the vehicle.

SUMMARY OF THE INVENTION

It is an object of the present invention to provide an improved method of modeling and controlling a direct injection stratified charge engine.

The foregoing and other objects and advantages are attained by a method of modeling and controlling a direct injection stratified charge (DISC) engine coupled to a lean $NO_x$ trap that is periodically, purged. The method comprises the steps of receiving as inputs a plurality of engine operating parameters and generating an indicated engine torque value, feedgas emission values, and an exhaust gas temperature value. Each of the output values is generated in accordance with a respective hybrid DISC engine model including an engine torque model, a feedgas emissions model, and an exhaust gas temperature model. The feedgas emissions model and exhaust gas temperature models further include submodels for generating output values as a function of either stratified or homogeneous engine operation.

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF THE PREFERRED EMBODIMENT(S)

Figure 1:
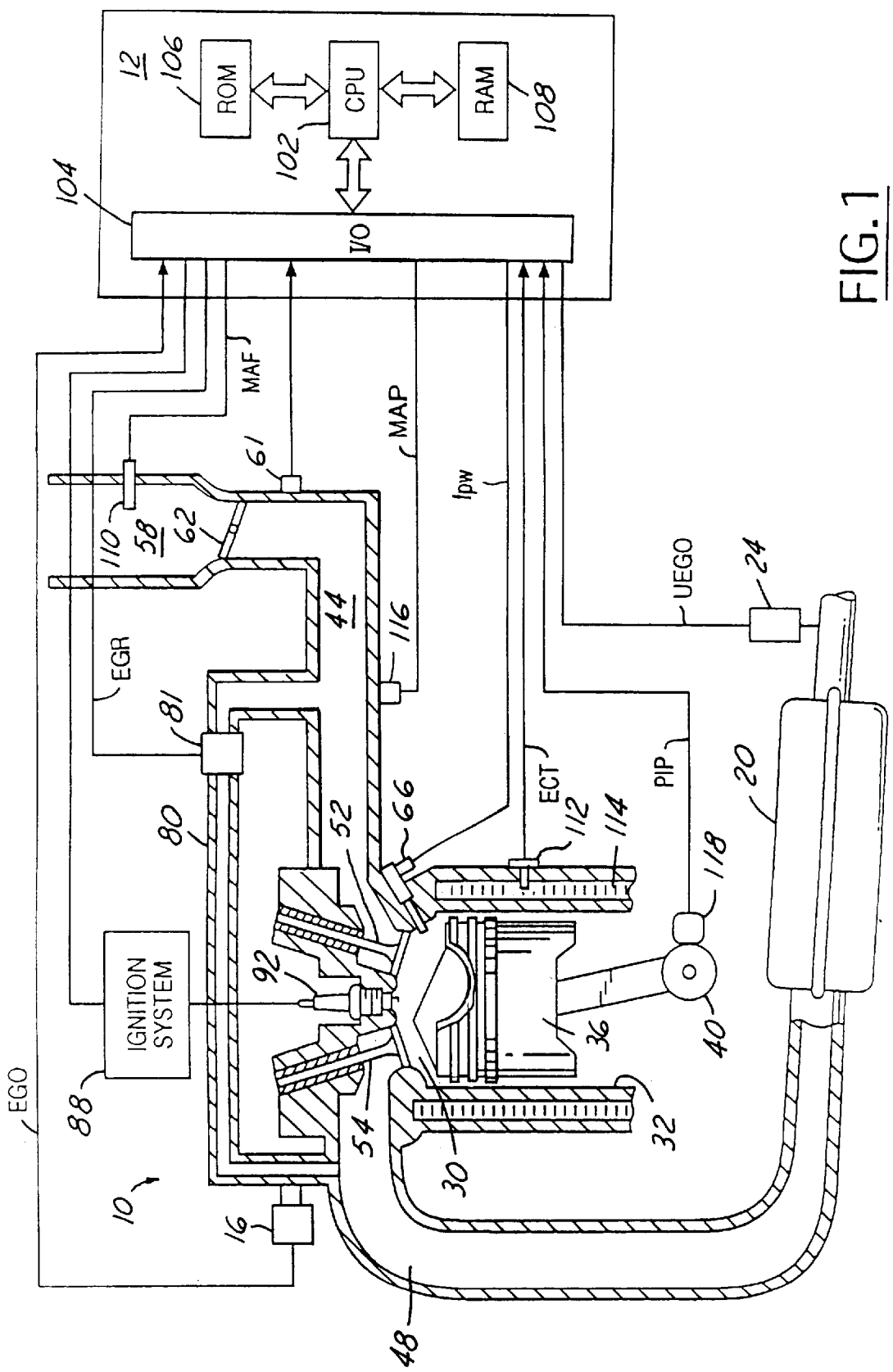
FIG. 1 is a block diagram of a DISC engine system where the present invention may be used to advantage.

Referring now to FIG. 1, there is shown a block diagram of a DISC engine system. The DISC engine system includes the engine 10 comprising a plurality of cylinders, one cylinder of which shown in FIG. 1, is controlled by an electronic engine controller 12. In general, controller 12 controls the engine air fuel (timing and quality), spark, EGR, etc., as a function of the output of sensors such as exhaust gas oxygen sensor 16 and proportional exhaust gas oxygen sensor 24. Continuing with FIG. 1, engine 10 includes a combustion chamber 30 and cylinder walls 32 with piston 36 positioned therein and connected to a crankshaft 40. Combustion chamber 30 is shown communicating with intake manifold 44 and exhaust manifold 48 via respective intake valve 52 and exhaust valve 54. Intake manifold 44 is shown communicating with throttle body 58 via throttle plate 62. Preferably, throttle plate 62 is electronically controlled via drive motor 61. The combustion chamber 30 is also shown communicating with a high pressure fuel injector 66 for delivering fuel in proportion to the pulse width of signal FPW from controller 12. Fuel is delivered to the fuel injector 66 by a fuel system (not shown) which includes a fuel tank, fuel pump, and high pressure fuel rail.

The ignition system 88 provides ignition spark to the combustion chamber 30 via the spark plug 92 in response to the controller 12.

Controller 12 as shown in FIG. 1 is a conventional microcomputer including a microprocessor unit 102, input/output ports 104, read-only memory 106, random access memory 108, and a conventional data bus. Controller 12 is shown receiving various signals from sensors coupled to the engine 10, in addition to those signals previously discussed, including: measurements of inducted mass airflow (MAF) from mass airflow sensor 110, coupled to the throttle body 58; engine coolant temperature (ECT) from temperature sensor 112 coupled to the cooling sleeve 114; a measurement of manifold pressure (MAP) from manifold sensor 116 coupled to intake manifold 44; and a profile ignition pickup signal (PIP) from Hall effect sensor 118 coupled to crankshaft 40.

The DISC engine system of FIG. 1 also includes a conduit 80 connecting the exhaust manifold 48 to the intake manifold 44 for exhaust gas recirculation (EGR). Exhaust gas recirculation is controlled by EGR valve 81 in response to signal EGR from controller 12.

The DISC engine system of FIG. 1 further includes an exhaust gas after-treatment system 20 which includes a three-way catalyst (TWC) and a lean $NO_x$ trap (LNT).

Figure 2:
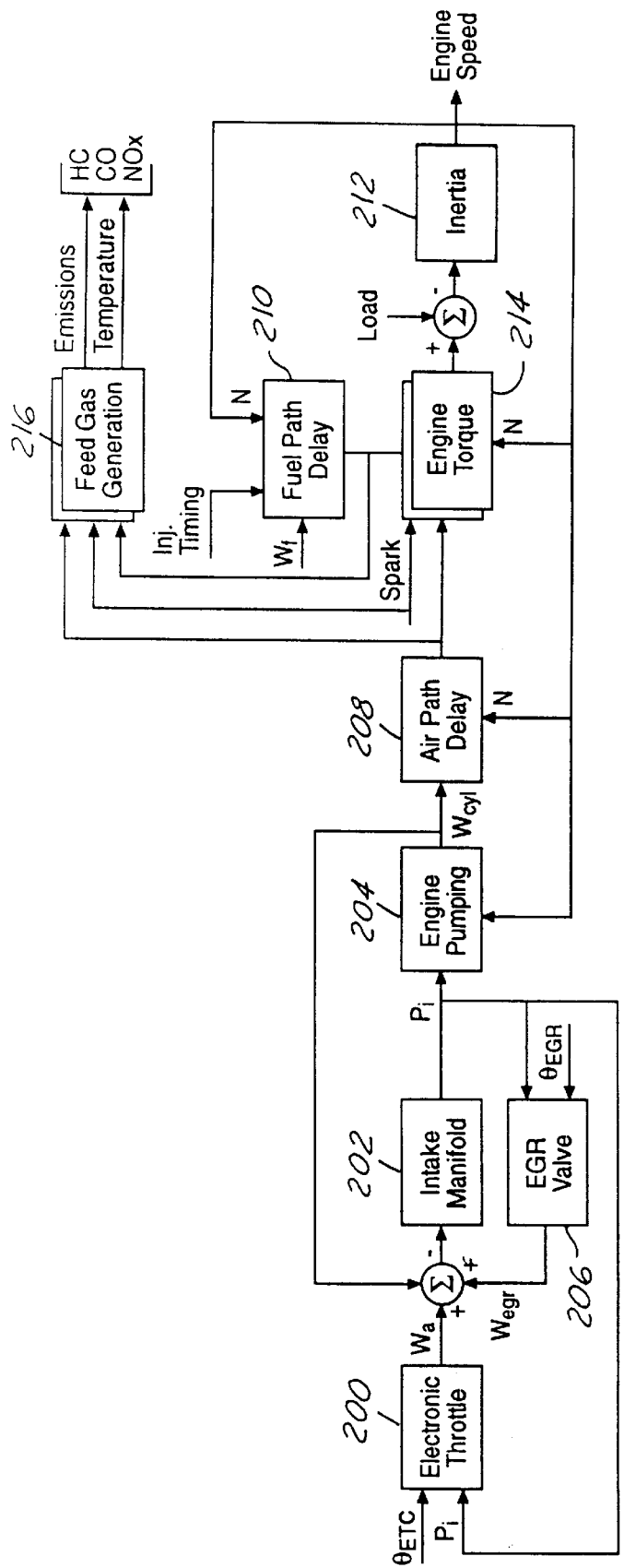
FIG. 2 is a block diagram of a DISC engine model, according to one embodiment of the present invention.

Referring now to FIG. 2, there is shown a block diagram of the DISC engine model according to the present invention. The model of FIG. 2 includes block representation of the following components or features: electronic throttle 200, the intake manifold 202, the engine pumping dynamics 204, the EGR system 206, the air path delay 208, the fuel path dynamics block 210, and the engine inertia and rotational dynamics model 212. The hybrid DISC engine model of FIG. 2 also includes the torque generation model 214, which predicts the indicated torque, brake torque, pumping loss, and mechanical friction torque based upon engine operating conditions, and the feedgas emission generation model 216, which predicts the flow rates of HC, CO, and $NO_x$ emissions.

Because of the different operating characteristics for stratified and homogeneous DISC engine operation, separate functions are used to represent the engine behavior in these distinct operating regimes. This feature renders the model shown in FIG. 2 hybrid in the sense that most components are characterized by two continuously-variable sub-models and a discrete switching mechanism which selects one of the two according to the injection timing. The exceptions are the electronic throttle model 200 and the intake manifold model 202, where a single model covers both operating modes and the behavior of these components is not influenced by the injection timing. The detailed functional representation of the sub-models will now be described in the following sub-sections.

The intake manifold model 202 relates to the ideal gas law and isothermic assumptions for the intake manifolds:

$$\frac{dPi}{d(t)} = K_i(W_a + W_{egr} - W_{cyl}) \tag{1}$$

where $K_i$ depends on the intake manifold volume and temperature $W_a$, $W_{egr}$ are the mass flow rates through the throttle body and the EGR valve, respectively; $W_{cyl}$ is the mean value of the charge inducted into the cylinders over an engine cycle. The flows through the throttle body 200 and the EGR valve 206 are represented by a standard orifice equation:

$$W_a = \frac{A_{th}p_i}{\sqrt{T_{amb}}}\phi\left(\frac{P_i}{P_{amb}}\right), \quad W_{egr} = \frac{A_{egr}P_e}{\sqrt{T_e}}\phi\left(\frac{P_i}{P_e}\right) \tag{2}$$

where $A_{th}$, $A_{egr}$ are the effective flow areas for the throttle body and EGR valve respectively; $P_i$, $P_e$, and $P_{amb}$ are intake manifold, exhaust manifold and ambient pressures; $T_{amb}$ and $T_e$ are the ambient and exhaust temperatures. The function $\phi$ represents the effects of the pressure ratio across the valve on the flow through the valve:

$$\phi(x) = \begin{cases} y^{\frac{1}{2}}\left(\frac{2}{y+1}\right)^{\frac{y+1}{2(y-1)}} & \text{if } x \leq \left(\frac{2}{y+1}\right)^{\frac{-y}{y-1}} \\ x^{\frac{1}{y}}\left\{\frac{2y}{y-1}\left[1-x^{\frac{y-1}{y}}\right]\right\}^{\frac{1}{2}} & \text{if } x > \left(\frac{2}{y+1}\right)^{\frac{-y}{y-1}} \end{cases} \tag{3}$$

where y is the ratio of specific heats.

In general, the amount of charge inducted into a cylinder in one intake event (120 $W_{cyl}$/(nN), where n is the number of cylinders) is proportional to the intake manifold pressure. Other variables, such as the engine speed (N) and the intake manifold temperature ($T_i$) also affect the pumping performance and volumetric efficiency. Based on observations of engine mapping data for many different engines, including DISC engines, the following static regression equation was used to represent the engine pumping rate:

$$W_{cyl} = (f_0^1 + f_1^1 N + f_2^1 T_i + f_3^1 P_i + f_4^1 NP_i + f_5^1 T_i P_i)N \tag{4}$$

where $f_1^1$, i=0, . . . , 5 are coefficients which are determined by regressing the test data using least squares or other curve fitting techniques. The intake manifold temperature depends on the air mass flow and EGR as determined by the function:

$$T_i = f_0^2 + f_1^2 E + f_2^2 W_a + f_3^2 E^2 + f_4^2 E W_a f_5^2 W_a^2 \tag{5}$$

with E being the mass percentage of EGR.

The volumetric efficiency for the engine can be then calculated as:

$$\eta_e = \frac{120 W_{cyl}}{\rho_{a,i} V_d N} \tag{6}$$

Where $\rho_{a,i}$ is the air density in either the ambient or intake manifold, and $V_d$ is the engine displacement volume.

The difference in volumetric efficiency between stratified and homogeneous operation results from the fact that the engine operates in different manifold pressure regimes. The stratified operation leads to higher manifold pressure and thus higher pumping efficiency. Otherwise, the functional dependency of the volumetric efficiency on the inputs P and N is similar for different modes.

The engine rotational dynamics and torques generation models represented by inertia block 212 and engine torque block 214 will now be described.

Given the engine average rotational inertia $J_e$, which includes the crankshaft and flywheel, the engine rotational dynamics follows the equation:

$$\pi/30 J_e \dot{N} = T_b - T_l \qquad (7)$$

where $T_b$, $T_l$ are the engine brake and load torque, respectively. The engine brake torque, $T_b$, is the net torque available on the crankshaft to drive the rest of powertrain, and can be decomposed into three terms:

$$T_b = T_i - T_{mf} - T_p \qquad (8)$$

where $T_i$ is the indicated torque, a measure of the total torque delivered to the piston by burning the fuel, $T_{mf}$ is the mechanical rubbing friction torque to overcome the resistance due to the moving parts of the engine, and $T_p$ is the torque needed to do the pumping work during intake and exhaust strokes.

The engine pumping losses 204 is related to the pumping mean effective pressure (pmep) as:

$$T_p = \frac{V_d \times pmep}{2\pi} \qquad (9)$$

In general, pmep is calculated from a p-V diagram and is a function of engine speed as well as intake and exhaust manifold pressures. In simple form, the pmep and the mechanical rubbing friction are represented by:

$$pmep = f_0^p + f_1^p P_i + f_2^p N + f_3^p P_i N + f_4^p N^2 \qquad (10)$$

$$T_{mf} = f_0^m + f_1^m P_i + f_2^m N + f_3^m N P_i + f_4^m N^2 \qquad (11)$$

Dynamometer test data of pmep and $T_{mf}$ versus intake manifold pressure indicates that increasing $P_i$ reduces the pumping work pmep. Stratified operation generally leads to higher intake manifold pressure and it is this operation at higher $P_i$ which is responsible for pmep reduction and more than half of the fuel economy improvement for DISC engines versus a PFI engine.

The engine torque model 214 can be represented as follows:

$$T_i = (a_t + b_t(\delta - \delta_{MBT})^2) W_f \qquad (12)$$

where $W_f$ is the fueling rate (in g/s), $(\delta - \delta_{MBT})$ is the spark timing deviation from its optimal setting, and $a_t, b_t$ are the coefficients for the torque model which will be discussed below.

At a given operating condition, there is an optimal spark timing ($\delta_{MBT}$) which corresponds to the maximum brake torque (MET) and thus the best fuel economy. MBT spark timing depends on engine operating variables such as engine speed, load, air-to-fuel ratio, EGR and injection timing. $\delta_{MBT}$ is used in the torque equation to normalize the effects of spark timing on engine torque. The model for $\delta_{MBT}$ is derived by either curve fitting the MBT spark timing data in terms of N,$P_i$,r,E, or regressing the engine torque as a function of N,$P_i$,r,E,$\delta$ and then analytically searching for the spark timing corresponding to the maximum torque (take $dT_b/d\delta = 0$ and solve for $\delta$). The coefficients in the torque equation $a_t$, $b_t$ depend on engine operating variables as well, are represented by the following functions:

$$a_t(N, r_c) = f_0^{a_t} + f_1^{a_t} N + f_2^{a_t}/N + f_3^{a_t} r_c \qquad (13)$$

$$b_t(N, r_c, F_r) = f_0^{b_t} + f_1^{b_t} r_c + f_2^{b_t} F_r + f_3^{b_t} N + f_4^{b_t}/N + f_5^{b_t} F_r N \qquad (14)$$

where $r_c$, $F_r$ is the equivalent air fuel ratio in the cylinder by taking into account the excess oxygen in the recirculated exhaust during the lean operation, and $F_r$ is the burned gas fraction. The terms $r_c$ and $F_r$ are defined as the ratios of air charge to fuel and burned gas to air charge respectively. At steady state, they are calculated from the measured exhaust air fuel ratio (r) and EGR percentage (E) as:

$$r_c = \left(1 + \frac{r - r_s}{1 + r} \frac{E}{100}\right) r, \quad F_r = \frac{1 + r_s}{1 + r}(E/100) \qquad (15)$$

with $r_s$ being the stoichiometric air-to-fuel ratio.

The coefficients in equations (13) and (14) depend upon the injection timing. At the minimum level, two sets of parameters are used to represent the homogeneous and stratified operation respectively. Given the engine torque model (12)–(14), a torque control strategy can be developed by rewiring the equations. Note that $r_c = W_{acyl}/W_f$ where $W_{acyl}$ is the total air charge inside the cylinder. Engine torque can be expressed as:

$$T_i = a_0 W_{acyl} + a_1(N) W_f + (b_0 W_{acyl} + b_1(N, F_r) W_f)(\delta - \delta_{MBT})^2 \qquad (16)$$

where:

$a_0 = f_3^{a_t}$ $a_1(N) = f_0^{a_t} + f_1^{a_t} N + f_2^{a_t}/N$ $b_0 = f_1^{b_t}$ $b_1(N, F_r) = f_0^{b_t} + f_2^{b_t} F_r + f_3^{b_t} N + f_4^{b_t}/N + f_5^{b_t} F_r N$

At any time instant, the required fueling rate ($W_f$) and spark timing ($\delta$) can be determined from equation (16) to deliver the demanded torque, provided that the estimated air charge $W_{acyl}$ and bussed gas fraction $F_r$ are updated according to the model outputs.

The feedgas HC, CO, and $NO_x$ emissions generation model 216 is complicated for DISC engines because the combustion takes place at different local air-to-fuel ratios throughout the cylinder during stratified operation. In general, the emission performance of a DISC engine is less robust and can be affected by many factors which are usually not included in a typical phenomenological model, such as the charge motion the cylinder, the fuel penetration, instantaneous in-cylinder pressure, etc.

Given the difficulties in predicting emissions for IC engines in general, and the. poor repeatability of stratified combustion for DISC engines in particular, the emissions model of the present invention focuses on matching the qualitative trend to predict the change in the emission behavior in response to the changes of inputs. The following functions are used to regress the dynamometer data:

$$W_{hc} = \begin{cases} (a_{hch} + b_{hch}(\delta - \delta_{MBT})) W_f & \text{homogeneous} \\ (a_{hcs} + b_{hcs}(\delta - \delta_{MBT}))(W_f + W_a) & \text{stratified} \end{cases} \qquad (17)$$

-continued $$W_{nox} = (a_{nox} + b_{nox}(\delta - \delta_{MBT}))W_f \qquad (18)$$

where $W_f$ is the fueling rate. The a's and b's in the emission model depend on $(P,N,r_c,F_r)$. In the model, a simple polynomial function is used to capture the dependency.

The CO emissions for homogeneous operation resemble those of a typical PFI engine and are primarily a function of air-fuel ratio and exhaust mass flow:

$$W_{co}=f(r_c)(W_a+W_f) \qquad (19)$$

For stratified operation, other than similar dependency of the CO emissions on air-fuel ratio and exhaust flow rate, the engine speed and spark timing also have some influence on the feedgas emissions, especially when the air-fuel ratio is relatively rich (less than 28:1). The HC and CO emissions are higher than in the homogeneous case because of the local rich mixture. Therefore, the following function is used to represent the CO emissions for the stratified operation:

$$W_{co}=f(r_c)g(N,\delta)(W_a+W_f) \qquad (20)$$

where $r_c$ is incorporated to account for the effect of N and $\delta$ and CO for relatively rich air/fuel ratios in the stratified operation.

In addition to the foregoing emissions models for both stratified and homogeneous operation modes, the engine exhaust gas temperature is also preferably modeled in the feedgas generation model 216.

The engine exhaust temperature is an important variable in a DISC engine because of the narrow temperature window for LNT operation. It must be closely monitored and tightly controlled during the LNT purge and desulphation process. In the feedgas generation model 216, the static exhaust temperature is represented by two polynomial functions with different inputs for stratified and homogeneous operation:

$$T_e = \begin{cases} T_s(F_f, N, P_i) & \text{stratified} \\ T_h(\delta, N, T_b) & \text{homogeneous} \end{cases} \qquad (21)$$

where $F_f=W_f/(W_f+W_a+W_{egr})$ is the fraction of the fuel in the total exhaust gas. The functions $T_s$ and $T_h$ are second order polynomial functions.

The DISC engine model was validated by comparing the model predicted outputs with actual outputs of a production DISC engine coupled to a dynamometer. Two data sets were collected to serve the purpose of parameter identification and model validation. The first data set, the identification data, is used to determine the coefficients in each of their regression functions identified above. The second data set, the validation data, is used to validate the model and confirm the extrapolation property of the regressions. In comparison, there was a close correlation between the model predicted outputs and dynamometer signals over the initial dataset.

From the foregoing, it can be seen that there has been brought to the art a new and improved DISC engine model which readily allows for DISC engine control strategy development and system optimization by a model based approach and computer aided control system design.

While the invention has been described in connection with one or more embodiments, it should be understood that the invention is not limited to those embodiments. On the contrary, the invention covers all alternatives, modifications, and equivalents, as may be included within the spirit and scope of the appended claims.

What is claimed is:

1. A method of modeling a DISC engine for developing engine operating parameters comprising the steps of:

receiving as an input a fueling rate ($W_f$) for said engine;

receiving as an input a spark timing value ($\delta$) for said engine;

generating an indicated engine torque as a function of said fueling rate and spark timing values, said engine torque being defined by the following model:

$$T_i=(a_t+b_t(\delta-\delta_{MBT})^2)W_f$$

wherein $W_f$ is the fueling rate, $\delta-\delta_{MBT}$ is the spark timing deviation from a desired setting, and $a_t$, $b_t$ are coefficients defined by the following equations:

$$a_t(N, r_c) = f_0^{a_t} + f_1^{a_t}N + \frac{f_2^{a_t}}{N} + f_3^{a_t}r_c$$

$$b_t(N, r_cF_r) = f_0^{b_t} + f_1^{b_t}r_c + f_2^{b_t}F_r + f_3^{b_t}N + \frac{f_4^{b_t}}{N} + f_5^{b_t}F_rN$$

wherein N is the engine speed, $r_c$ is the ratio of air charge to fuel and $E_c$ is the ratio of burned gas to air charge defined by the following equations:

$$r_c = \left(1 + \frac{r-r_s}{1+r}\frac{E}{100}\right)r, \quad F_r = \frac{1+r_s}{1+r}(E/100)$$

wherein r is the measured exhaust air/fuel ratio and E is the EGR percentage, wherein $a_t$ and $b_t$ depend upon the combustion mode of said engine, said engine torque being used to generate engine operating setpoints.

2. A method of modeling a DISC engine according to claim 1 further comprising the steps of:

generating exhaust gas emissions values for HC, CO and $NO_x$ as a function of said fueling rate and spark timing values.

3. A method of modeling a DISC engine according to claim 2 wherein said exhaust gas HC emission value is defined by the following equation in a stratified engine operating mode:

$$W_{hc}=(a_{hcs}+b_{hcs}(\delta-\delta_{MBT}))(W_f+W_a)$$

and said exhaust gas HC emission value being defined by the following equation in a stratified engine operating mode:

$$W_{hc}=(a_{hch}+b_{hch}(\delta-\delta_{MBT}))W_f$$

wherein the value of the functions a and b depend upon exhaust manifold pressure, engine speed, $r_c$, $F_r$ and injection timing;

said exhaust gas $NO_x$ emission value is defined by the following equation:

$$W_{nax}=(a_{nax}+b_{nax}(\delta-\delta_{MBT}))W_f$$

wherein the value of the functions a and b depend upon exhaust manifold pressure, engine speed, $r_c$, $F_r$ and injection timing; and said exhaust gas CO emission value is defined by the following equation in the homogeneous engine operating mode:

$$W_{co}=f(r_c)(W_a+W_f)$$

wherein $W_a$ is the exhaust gas mass airflow rate, and said exhaust gas CO emission value is defined by the following equation in the stratified engine operating mode:

$$W_{co}=f(r_c)g(N,\delta)(W_a+W_f)$$

wherein N is the engine speed, said exhaust gas emissions values being used to generate engine operating setpoints.

4. A method of modeling a DISC engine according to claim 1 further comprising the steps of:

generating an exhaust gas temperature value for monitoring lean $NO_x$ trap operation according to the following equations:

$$T_e = \begin{cases} T_s(F_f, N, P_i) & \text{stratified} \\ T_h(\delta, N, T_b) & \text{homogeneous} \end{cases}$$

wherein $F_f=W_f/(W_f+W_a+W_{egr})$ is the fraction of fuel in the total exhaust gas, and the functions $T_s$ and $T_h$ are second order polynomial functions.

5. In a DISC engine system controlled by a powertrain control module which receives as inputs a plurality of engine operating parameters and outputs a plurality of calibration setpoints, said powertrain control module including a microprocessor and associated memory, a method of controlling said DISC engine comprising the steps of:

inputting into a mathematical model of said DISC engine said plurality of engine operating parameters, said mathematical model including an indicated engine torque value according to the following equation:

$$T_i=(a_t+b_t(\delta-\delta_{MBT})^2)W_f$$

wherein $W_f$ is the fueling rate, $\delta-\delta_{MBT}$ is the spark timing deviation from a desired setting, and $a_t$, $b_t$ are coefficients defined by the following equations:

$$a_t(N, r_c) = f_0^{a_t} + f_1^{a_t}N + \frac{f_2^{a_t}}{N} + f_3^{a_t}r_c$$

$$b_t(N, r_c F_r) = f_0^{b_t} + f_1^{b_t}r_c + f_2^{b_t}F_r + f_3^{b_t}N + \frac{f_4^{b_t}}{N} + f_5^{b_t}F_rN$$

wherein N is the engine speed, $r_c$ is the ratio of air charge to fuel and $F_r$ is the ratio of burned gas to air charge defined by the following equations:

$$r_c = \left(1 + \frac{r-r_s}{1+r}\frac{E}{100}\right)r, \quad F_r = \frac{1+r_s}{1+r}(E/100)$$

wherein r is the measured exhaust air/fuel ratio and E is the EGR percentage wherein $a_t$ and $b_t$ depend upon the combustion mode of said engine;

calculating calibration setpoints for air/fuel ratio exhaust gas recirculation rate and the spark set point for said DISC engine with said mathematical model as a function of said plurality of engine operating parameters; and outputting said calibration setpoints to the respective associated engine control subsystems.

6. A method of controlling a DISC engine according to claim 5 further comprising the steps of:

generating exhaust gas emissions values for HC, CO and $NO_x$ as a function of said fueling rate and spark timing values.

7. A method of controlling a DISC engine according to claim 6 wherein said exhaust gas HC emission value being defined by the following equation in a stratified engine operating mode:

$$W_{hc}=(a_{hcs}+b_{hcs}(\delta-\delta_{MBT}))(W_f+W_a)$$

and said exhaust gas HC emission value being defined by the following equation in a stratified engine operating mode:

$$W_{hc}=(a_{hch}+b_{hch}(\delta-\delta_{MBT}))W_f$$

wherein the value of the functions a and b depend upon exhaust manifold pressure, engine speed, $r_c$, $F_r$ and injection timing;

said exhaust gas $NO_x$ emission value is defined by the following equation:

$$W_{nox}=(a_{nox}+b_{nox}(\delta-\delta_{MBT}))W_f$$

wherein the value of the functions a and b depend upon exhaust manifold pressure, engine speed, $r_c$, $F_r$ and injection timing; and said exhaust gas CO emission value is defined by the following equation in the homogeneous engine operating mode:

$$W_{co}=f(r_c)(W_a+W_f)$$

wherein $W_a$ is the exhaust gas mass airflow rate, and said exhaust gas CO emission value is defined by the following equation in the stratified engine operating mode:

$$W_{co}=f(r_c)g(N,\delta)(W_a+W_f)$$

wherein N is the engine speed, said exhaust gas emissions values being used to generate engine operating setpoints.

8. A method of controlling a DISC engine according to claim 5 further comprising the steps of:

generating an exhaust gas temperature value for monitoring lean $NO_x$ trap operation according to the following equations:

$$T_e = \begin{cases} T_s(F_f, N, P_i) & \text{stratified} \\ T_h(\delta, N, T_b) & \text{homogeneous} \end{cases}$$

wherein $F_f=W_f/(W_f+W_a+W_{egr})$ is the fraction of fuel in the total exhaust gas, and the functions $T_s$ and $T_h$ are second order polynomial functions.

9. A control system for a vehicle having a direct injection stratified charge (DISC) engine coupled to a lean NOx trap that is periodically purged, the system comprising:

an engine torque model representing the torque characteristics of said DISC engine, said engine torque model receiving as an input a first plurality of engine operating parameters and generating as an output an expected engine torque value;

a feedgas emissions model representing the emissions output of said DISC engine, said feedgas generation model receiving as an input a second plurality of engine operating parameters and generating as an output an HC value, CO value and $NO_x$ value; and an exhaust gas temperature model representing the exhaust gas temperature of said DISC engine, said exhaust gas temperature model receiving as an input a third plurality of engine operating parameters and generating as an output an exhaust gas temperature value.

10. The control system of claim 9 wherein said first plurality of engine operating parameters includes a fueling rate value and spark timing value.

11. The control system of claim 9 wherein said second plurality of engine operating parameters includes a fueling rate value, a spark timing value, an air/fuel ratio value, an EGR flow value, and an engine speed value.

12. The control system of claim 11 wherein said feedgas emissions model includes a stratified engine operation model for generating a stratified HC value and stratified CO value, and a homogeneous engine operation model for generating a homogeneous HC value and homogenous CO value.

13. The control system of claim 9 wherein said third plurality of engine operating parameters includes an engine speed value, a fuel fraction value, an intake manifold pressure value, a spark timing value, and an engine brake torque value.

14. The control system of claim 10 wherein said exhaust gas temperature model includes a stratified engine operation model for generating a stratified exhaust gas temperature value and a homogeneous engine operation model for generating a homogeneous exhaust gas temperature value.

15. The torque control system of claim 9 further comprising an intake manifold model representing the intake manifold dynamics of said DISC engine, said intake manifold model receiving as an input a fourth plurality of engine operating parameters and generating as an output an intake manifold pressure value.

16. The torque control system of claim 15 wherein said fourth plurality of engine operating parameters includes a mass airflow rate value, an EGR flow rate value, and a cylinder air charge value.

* * * * *